Oct. 25, 1960   D. S. STERNER   2,957,680
AUTOMATIC CONTROL SYSTEM FOR OPTIONAL HEATING AND COOLING
Filed March 11, 1957   2 Sheets-Sheet 1

INVENTOR.
DOUGLAS S. STERNER
BY Flam and Flam
ATTORNEYS.

Oct. 25, 1960  D. S. STERNER  2,957,680
AUTOMATIC CONTROL SYSTEM FOR OPTIONAL HEATING AND COOLING
Filed March 11, 1957  2 Sheets-Sheet 2

INVENTOR.
DOUGLAS S. STERNER
BY Flam and Flam
ATTORNEYS.

United States Patent Office 2,957,680
Patented Oct. 25, 1960

2,957,680

AUTOMATIC CONTROL SYSTEM FOR OPTIONAL HEATING AND COOLING

Douglas S. Sterner, Sherman Oaks, Calif., assignor to General Controls Co., Glendale, Calif., a corporation of California Filed Mar. 11, 1957, Ser. No. 645,088

1 Claim. (Cl. 257—287)

This invention relates to combination heating and air-conditioning systems, and particularly to the thermostatic control of such systems.

In such combined systems, a single thermostat is commonly used. In a typical example, a bimetal arm moves between opposed contacts. One contact, engaged when the temperature drops to a predetermined level, initiates operation of a fan or other load for circulating heated air. The opposite contact, engaged when the temperature rises to a predetermined level, initiates operation of a fan or other load for circulating cooled air. The heating or cooling of the air may be accomplished by a fluid medium flowing through pipes; this fluid medium is such that it may transmit or absorb heat from the air. Heretofore, a manually operated, double-throw switch, usually affixed to the thermostat housing, selects the contact to be inserted in a control circuit. Not uncommonly, a single control circuit, including a relay, for example, is used for both heating and cooling. For example, the relay may operate a fan for passing circulated air about coils containing a medium that is either cooled or heated.

Operation of the switch is, of course, essential to proper operation of the system. The primary object of this invention is to eliminate such manually operated switches and to provide means for automatically inserting the appropriate contact in the control circuit.

Another object of this invention is to utilize an element that detects whether a cooled or a heated medium is supplied to the system for automatically conditioning a thermostatic control circuit for either type of operation.

Still another object of this invention is to provide compact apparatus of this character that can readily be affixed to any pipe or conduit in which the cooling or heating fluid medium exists.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claim.

Referring to the drawings.

Figure 1:
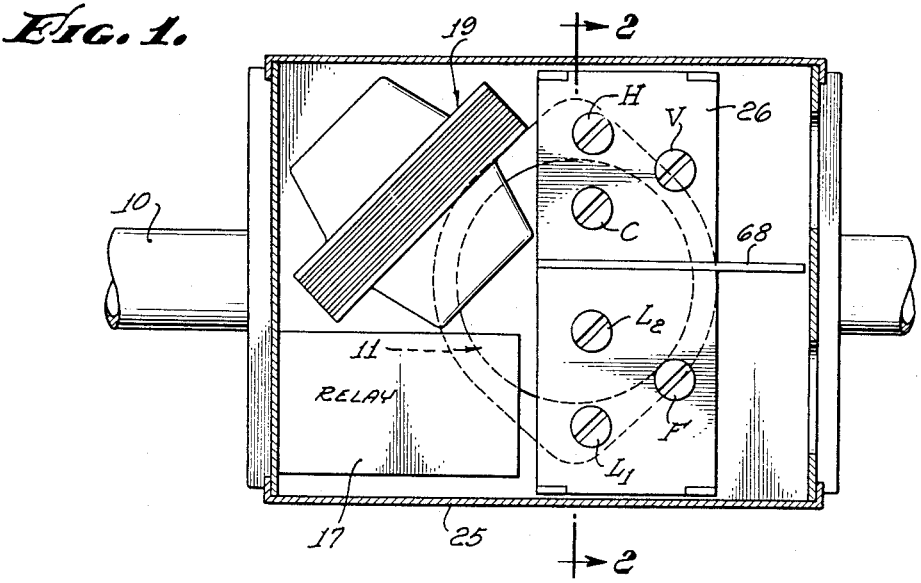
Figure 1 is a top plan view of the apparatus incorporating the present invention, the casing being illustrated in section.

A thermostat structure 13 (Fig. 5) includes an arm 14 movable upon a decrease of the temperature to a preset value to engage one contact 15 and movable upon an increase of the temperature to a preset value to engage the opposite contact 16. The contact 15, accordingly, is useful in demanding operation of a heating system, and the other contact is useful in demanding operation of a cooling system.

The thermostat operates a load or load operator, such as a relay 17. For this purpose, the thermostat arm 14 is in circuit with the operating coil of the relay 17. A secondary coil 18 of a step-down transformer 19 is, in this instance, interposed between one terminal of the relay 17 and the arm 14 of the thermostat 13 for supplying electrical energy to the control circuit.

The relay circuit is completed through the thermostat contact 15 when the system is operated for heating and through the other thermostat contact 16 when the system is operated for cooling. For this purpose, a double-pole circuit controller 11 is provided. The central arm 22 of the circuit controller is connected to the other terminal of the relay 17. Contacts 20 and 23 of the circuit controller are respectively connected to the thermostat contacts 15 and 16 through connections 21 and 24. Thus, the controller 11 conditions the thermostat circuit either for heating or cooling systems.

A double-pole or other suitable circuit controller, as exemplified by the circuit controller 11, is vital in a system in which close temperature settings are normally provided for both heating and cooling. Thus, for example, if the circuit controller 11 would be omitted and connections 21 and 24 were directly joined to the terminal of the operating coil of the load operator 17, a slight rise in temperature above that at which the heating system is intended to operate might cause engagement of the contact 16, since the contact arm moves toward the left in response to a rise in temperature. This would energize the load operator, and overcorrect contrary to demand. Thus, operation of the heating system would continue uninterruptedly.

In order to operate the circuit controller 11 automatically, a thermally responsive element 12 (such as a bimetal), sensing the existence of a heating or a cooling medium in a conduit 10 common to the heating and cooling systems, is provided. This element 12 actuates the circuit controller 11.

The load operator or relay 17, the step-down transformer 18, the circuit controller 11 and the temperature sensing actuator 12 are all accommodated within a common housing 25, as shown in Fig. 1. Also located within the housing 25 is an appropriate terminal bracket 26 whereby suitable connections can be made to the thermostat, the load and the power lines.

The housing 25 is conveniently secured directly to the conduit 10, which contains the heating or cooling medium, by the aid of a clamping device 27. The clamping device includes two opposed elements 28 and 30 which together grasp the conduit 10. One of the elements 28 of the clamping device, made of good heat-conducting material, such as an aluminum alloy, is secured to the lower portion of the housing 25. An inverted V-shaped notch or recess 29, formed centrally on the lower side of the clamping element 28, engages one side of the conduit 10. The other clamping element 30 has an arcuate cavity 31 engaging the opposite side of the conduit 10.

The concavity 31 provides an appropriate seat for the conduit 10. The clamping elements 28 and 30 are drawn together for clamping action by a pair of clamping bolts 32 and 33. These bolts pass through openings in the clamping element 30 and cooperate respectively with through threaded apertures 34 and 35 provided in the housing-mounted clamping element 28.

The sloping sides of the recess 29 provide areas appropriately engageable with conduits of various sizes. The curvature of the cavity 31 is sufficiently small to allow proper seating of various conduits.

In order to minimize the thickness and thus promote the heat-conducting characteristics of the clamping element 28, for purposes to be described more fully hereinafter, and yet allow for various sizes of conduits to be accommodated between the clamping elements, the ends of the bolts 32 and 33 are permitted to enter within the housing. For this purpose, the lower wall of the housing 25 has appropriate clearance apertures 36 and 37.

A molded plastic base 38 (Fig. 4) having a cavity and a thin metal cover or cap 39 secured upon the base 38 provide a common casing for the sensing element 12 and the circuit controller 11. The cap 39 overlies the cavity and has an annular flange 41 in which the base 38 is telescopically received. A series of fingers 42, formed at the end of the flange 41, are bent over to engage slots 43 of the base 38, whereby the cover 39 is secured in place.

The thermally responsive element 12, which is in the form of a bimetal disk, is accommodated in a central dome 40 of the cap 39, the cap 39 forming a support for the disk 12. The circular edges of the elements of the bimetal disk 12 are confined within the dome 40. Accordingly, the bimetal disk 12 either cups upwardly or downwardly, depending upon the temperature of the disk 12. This movement operates the circuit controller 11 in a manner to be hereinafter described.

Figure 2:
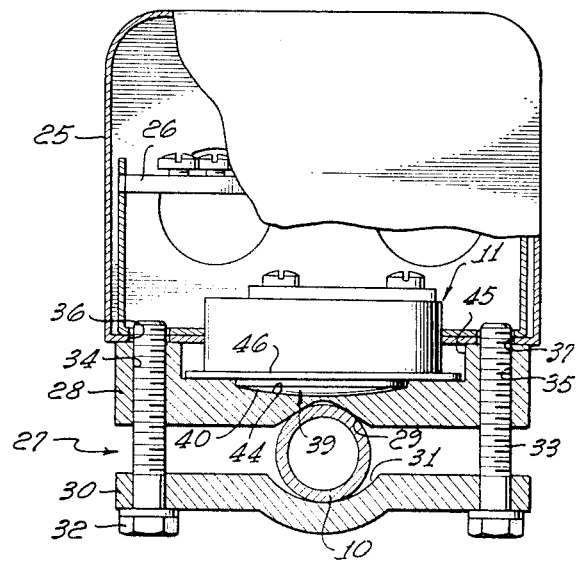
Fig. 2 is a sectional view, taken along a plane indicated by line 2—2 of Fig. 1.

In order that the disk 12 effectively responds to the temperature of the fluid in the conduit 10, it is placed in intimate heat-transferring relationship with respect to the conduit 10. For this purpose, the dome 40 is oriented downwardly as shown in Fig. 2, and it fits a corresponding cavity 44 in the clamping element 28. The cavity 44 is formed in the bottom of a recess 45 on the housing side of the clamping element 28 and extends close to the V-recess 29 on the opposite side of the clamping element 28.

By virtue of the clamp 27, the conduit 10 is in intimate heat-transfer relationship with the clamping element 28; and by virtue of the fit between the dome 40 and the clamping element 28, the disk 12 is in intimate heat-transfer relationship with respect to the clamping element 28. Accordingly, the disk 12 is effectively responsive to the temperature of the fluid in the pipe 10.

Figure 3:
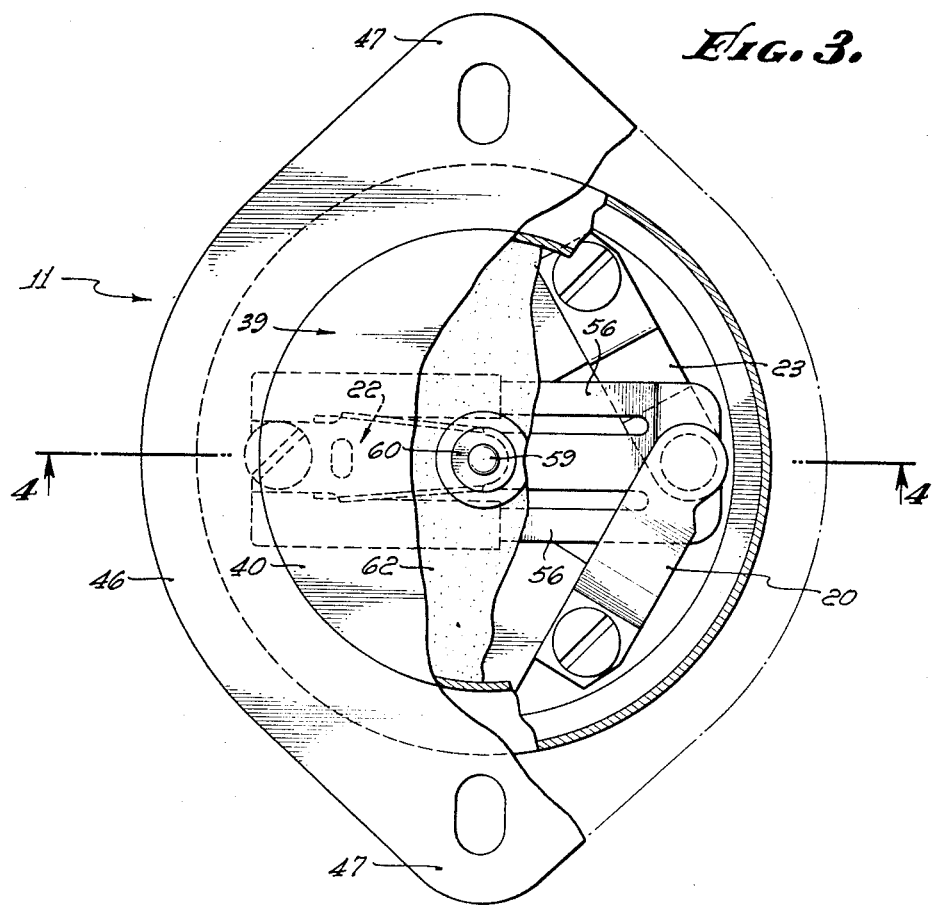
Fig. 3 is an enlarged top plan view of the switch portion of the apparatus, some of the casing parts being broken away and shown in section.

A mounting ring 46 (Fig. 4) mounts the base 38 and holds the dome 40 in the cavity 44. For this purpose, the dome 40 projects through the mounting ring 46, and the mounting ring is appropriately spot-welded or otherwise secured to the outer margins of the cover 39. The ring 46 is accommodated within the recess 45 of the clamping element 28, and is appropriately secured thereto as by machine screws (not shown) passing through apertured ears 47 (Fig. 3) of the mounting ring.

Opposite cupping of the disk 12 or increased and decreased cupping causes translation of the center of the disk 28, and this translation is utilized for operating a snap switch located within the cavity 48 (Fig. 4) of the base 38. The snap switch includes the arm 22 which is in the form of a leaf spring. The arm 22 is fixed at its left-hand end by the aid of a screw 50 cooperating with a sleeve 51 inserted in an appropriate recess in the base 38. The right-hand or free end of the leaf spring 22 carries a contact member 52 on its upper side cooperable with the contact 20. The contact 23 carries a contact member 53 cooperable with the lower side of the end of the spring 22. These contacts 20 and 23 are in the form of arms (Fig. 3) secured to the base 38, and having ends located on opposite sides of the arm 22.

A snap action is achieved by two returned integral legs 56 of the spring arm which abut seats provided by a stationary reaction member 57. As the leaf spring 22 flexes downwardly beneath the fixed ends of the legs 56, as viewed in Fig. 4, the free end of the leaf spring 22 snaps correspondingly. When the arm returns so that it moves above the fixed ends of the legs 56, the free end of the leaf spring 22 snaps upwardly.

Figure 4:
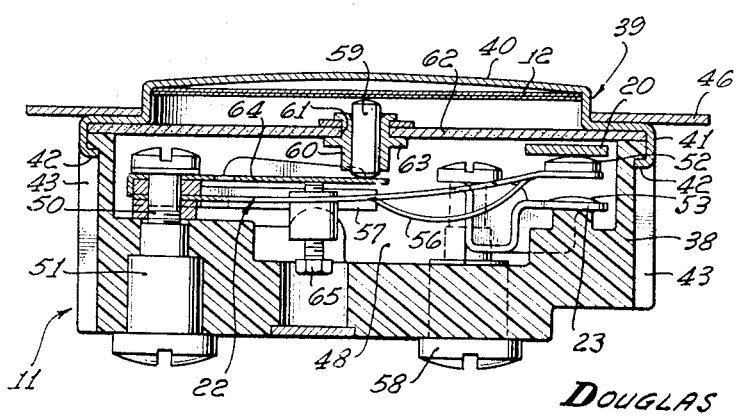
Fig. 4 is a sectional view, taken along a plane indicated by line 4—4 of Fig. 3.

Terminal members 58, accessible on the lower portion of the base 38 as viewed in Fig. 4 or the upper portion of the base as viewed in Fig. 2, provide appropriate electrical connection to the contact members 20 and 23 and to the leaf spring 22.

For moving the switch arm 22, a pin 59 is provided. This pin is slidably supported in a bushing 60, and the ends of the pin project beyond the ends of the bushing. The bushing 60 is mounted at a central aperture 61 of an insulation disk 62, the edges of which are clamped between the flange 41 of the cover 39 and the end of the base 38. In this instance, the bushing 60 has an intermediate flange 63 engaging the disk 62 on the lower side thereof, as viewed in Fig. 4. The upper end of the bushing is worked outwardly by a suitable operation whereby the bushing is held in place.

The upper end of the pin 59 is located in alignment with the center of the thermally responsive disk 12 and is engaged thereby upon cupping of the disk 12 in such direction as to cause the center to move downwardly, as viewed in Fig. 4. The opposite end of the pin 59 engages a spring arm 64 which, in turn, engages a calibration screw 65 carried by the leaf spring 22.

As the thermally responsive element 12 bows or cups in a direction to translate the center thereof downwardly, the pin 59 flexes the leaf spring 22 and the contact 20 is engaged. The load operator 17 is thus in circuit with the thermostat contact 16. When the element 12 returns upwardly, the arm 22 also returns, and the contact 23 is engaged and the load operator cooperates with the other thermostat contact 15.

Figure 5:
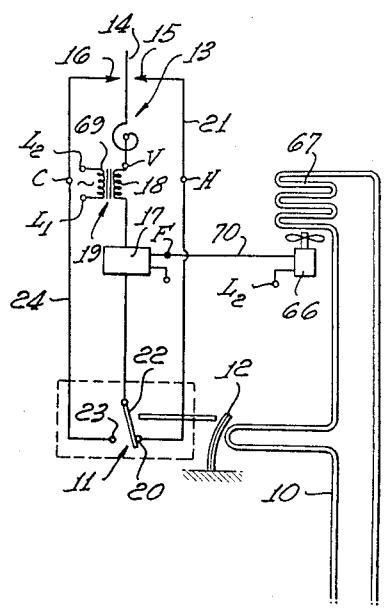
Fig. 5 is a wiring diagram and illustrating some of the parts diagrammatically.

In Fig. 5, there is illustrated a fan motor 66 which may form at least part of the load. The conduit 10 is illustrated as having convolutions, as at 67, to form coils with which the fan associated with the motor 66 cooperates.

The terminal bracket 26 is divided into two portions by a barrier 68, corresponding respectively to high voltage side and low voltage side. The low voltage sides include posts H, C and V, also indicated in Fig. 3. The terminals for the contacts of the thermostat 13 are appropriately connected to posts H and C. The terminals for the contacts of the circuit controller 11 are conveniently internally connected by leads (not shown) to posts H and C. The terminal V is connected to the terminal for the movable arm 14 of the thermostat 13 and, in this instance, internally to one side of the low voltage winding 18. The other side of the low voltage winding is directly connected to one side of the relay 17, and the other side of the relay 17 is directly connected to the terminal for the spring arm 22 of the sensing circuit controller 11.

The high voltage side of the terminal bracket includes posts $L_1$ and $L_2$ for the power lines and a load terminal post F. The primary winding 69 of the transformer 19 connects across these posts. One side of a switch element (not shown) controlled by the relay 17 is connected to post $L_1$. A lead 70 cooperates with the post F, which is connected to the other side of the controlled switch element. This lead 70 connects remotely to one side of the fan motor 66. The other side of the fan motor may connect remotely to the power line connected to post $L_2$.

Other load circuits (not shown), such as for electromagnetic valves, may be connected across posts $L_1$ and F, all in accordance with the design of the heating and cooling system.

The inventor claims:

In a combination heating and cooling system in which a fluid medium is used: electrically energizable means for activating the system; a bimetal member carrying a contact member and subjected to the temperature of the place which is to be heated or cooled; a pair of contact members respectively on opposite sides of the bimetal member; the spacing between the pair of contact members being such that the system is required to provide heat when one of them is engaged by the bimetal contact member, and the system is required to provide cooling when the other of the pair of contact members is engaged by the bimetal contact member; a second pair of contacts respectively connected to the first pair; a sensing thermostat subjected to the temperature of the fluid medium; a snap acting device actuated by the thermostat and including an arm for selectively contacting either one or the other of the said second pair of contacts; and circuit forming means connecting the said electrically energizable means, the bimetal member and the arm in series for energizing said means when the bimetal member and the sensing thermostat respectively contact those of each pair of contact members which are connected together.

References Cited in the file of this patent

UNITED STATES PATENTS

| | | |
|---|---|---|
| 1,572,969 | Schwimmer | Feb. 16, 1926 |
| 1,996,907 | Drake | Apr. 9, 1935 |
| 1,997,262 | McGoldrick | Apr. 9, 1935 |
| 2,121,625 | Crago | June 21, 1938 |
| 2,273,381 | Shaw | Feb. 17, 1942 |
| 2,547,657 | Olsen | Apr. 3, 1951 |